United States Patent
Sakai

(10) Patent No.: US 7,813,769 B2
(45) Date of Patent: *Oct. 12, 2010

(54) ONBOARD WIRELESS COMMUNICATION SYSTEM

(75) Inventor: Hiroshi Sakai, Okazaki (JP)

(73) Assignee: Denso Corporation, Kariya (JP)

( * ) Notice: Subject to any disclaimer, the term of this patent is extended or adjusted under 35 U.S.C. 154(b) by 391 days.

This patent is subject to a terminal disclaimer.

(21) Appl. No.: 11/998,553

(22) Filed: Nov. 30, 2007

(65) Prior Publication Data

US 2008/0088422 A1    Apr. 17, 2008

Related U.S. Application Data

(63) Continuation of application No. 11/056,053, filed on Feb. 11, 2005, now Pat. No. 7,356,358.

(30) Foreign Application Priority Data

| Feb. 12, 2004 | (JP) | ............................. 2004-034908 |
| Dec. 24, 2004 | (JP) | ............................. 2004-373485 |

(51) Int. Cl.
*H04B 1/38* (2006.01)

(52) U.S. Cl. .................... 455/567; 455/575.1; 455/90.3

(58) Field of Classification Search ........................ None
See application file for complete search history.

(56) References Cited

U.S. PATENT DOCUMENTS 5,159,257 A  * 10/1992 Oka et al. .................... 320/136

(Continued)

FOREIGN PATENT DOCUMENTS

| JP | 05-322998 | 12/1993 |
| JP | 10-070844 | 3/1998 |

(Continued)

OTHER PUBLICATIONS

Official action dated Jan. 6, 2009 in JP Application No. 2004-373485.

(Continued)

*Primary Examiner*—Lester Kincaid
*Assistant Examiner*—Phuoc Doan
(74) *Attorney, Agent, or Firm*—Harness, Dickey & Pierce, PLC

(57) ABSTRACT

An onboard wireless communication system includes a power supply circuit, a wireless communication circuit, a control circuit, and a current integration circuit. The current integration circuit calculates an integration value of current fed from a battery after the battery starts discharging. The current integration circuit temporarily stops the calculation until transmission of a burglar alarm signal is completed when a burglar detection signal is outputted from a burglar detection ECU while the integration value is still smaller than a reference value. As a result, power supply from the power supply circuit to the wireless communication circuit is maintained. The power supply is stopped when the integration value is equal to or larger than the reference value while the burglar detection signal is still not outputted from the burglar detection ECU.

34 Claims, 10 Drawing Sheets

U.S. PATENT DOCUMENTS

| | | | |
|---|---|---|---|
| 6,157,317 A * | 12/2000 | Walker | 340/7.1 |
| 6,630,749 B1 | 10/2003 | Takagi et al. | |
| 2002/0075165 A1 | 6/2002 | Yoshioka et al. | |
| 2004/0203498 A1 | 10/2004 | Kuo | |

FOREIGN PATENT DOCUMENTS

| | | |
|---|---|---|
| JP | 2001-157372 | 6/2001 |
| JP | 2003-63330 | 3/2003 |
| JP | 2003-191803 | 7/2003 |

OTHER PUBLICATIONS

Examination Reprot in corresponding CN Application No. 200510008083X received Jul. 20, 2007.

Office Action dated Nov. 20, 2006 in CN Application No. 200510008083 with English translation.

* cited by examiner

ONBOARD WIRELESS COMMUNICATION SYSTEM

CROSS-REFERENCE TO RELATED APPLICATIONS

This application is a continuation application of U.S. patent application Ser. No. 11/056,053 filed on Feb. 11, 2005. This application claims the benefit of JP 2004-373485 filed Dec. 24, 2004 and JP 2004-034908 filed Feb. 12, 2004. The disclosures of the above applications are incorporated herein by reference.

FIELD OF THE INVENTION

The present invention relates to an onboard wireless communication system.

BACKGROUND OF THE INVENTION

In one kind of onboard communication systems, a signal is transmitted to a service center when it receives a burglar alarm signal from a burglar detection ECU. A wireless communication unit of this kind of onboard communication system is required to be always turned on so that the burglar detection ECU can detect burglary any time and send the burglar alarm signal to the service center whenever it has detected burglary. With this configuration, a battery may be exhausted when a vehicle is parked for a long time and a discharging period of the battery becomes long.

To protect the battery from exhaustion, a function for forcibly terminating power supply from a battery to ECUs is proposed in JP-A-2003-63330. A power supply ECU is connected between the battery and the ECUs for monitoring the amount of current flowing from the battery to the ECUs. It forcibly terminates power supply from the battery to the ECUs when the amount of the current exceeds a reference value.

Sending a burglar alarm signal may be more important than protecting a battery from exhaustion because the burglary is more harm to a user than the dead battery. The above-described function terminates power supply from a battery to a wireless communication unit even during transmission of a burglar alarm signal to a service center. As a result, the burglar alarm signal cannot be properly sent to the service center.

SUMMARY OF THE INVENTION

The present invention therefore has an objective to provide an onboard wireless communication system that performs communication operation and battery save operation as preferred by a user. An onboard wireless communication system of the present invention includes power supply means, wireless communication means, control means, current detection means and current integration means.

The power supply means supplies power from a battery to the wireless communication means. The wireless communication means transmits signals outside the onboard wireless communication system. The control means controls operations of the power supply means and the wireless communication means. The current detection means detects current fed from the battery to the power supply means. The current integration means calculates an integration value of the current fed from the battery to the current detection means as a consumption current of the onboard wireless communication system.

The current integration means calculates the integration value of the current fed after the battery starts discharging. It temporarily stops the calculation at least until transmission of an emergency signal by the wireless communication means is completed when an emergency detection signal is inputted from an onboard ECU to the control means while the current integration value is still smaller than the first reference value. As a result, the power supply from the power supply means to the wireless communication means is maintained. If the current integration value becomes equal to or larger than the first reference value before the emergency detection signal is inputted to the control means, the power supply is stopped based on an instruction of the control means.

With this configuration, the power supply from the power supply means to the wireless communication means is maintained until the transmission of an emergency report signal, such as a burglar alarm signal, is completed even after an ignition switch is turned off and the battery starts discharging. Therefore, the power supply to the wireless communication means is less likely to be interrupted during the transmission of the emergency signal and the emergency signal is properly transmitted to a service center. If the current integration value becomes equal to or larger than the first reference value before the emergency detection signal is detected, the power supply from the power supply means to the wireless communication means is the emergency detection signal is stopped. Thus, the battery is protected from exhaustion.

With this configuration, the transmission of the burglar alarm signal and the protection of the battery are flexibly performed, that is, such operations are performed as preferred by the user. The wireless communication system draws the current from the battery and calculates the current integration value from the current. Thus, the wireless communication system can calculate the consumption current with high accuracy. Moreover, the current integration means is provided separately from the control means, that is, it can be constructed in a low power consumption configuration even when the control means cannot be constructed in such a configuration. Therefore, the current integration means can perform the current integration value calculation with low power consumption and therefore the power consumption of the wireless communication system can be maintained low.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
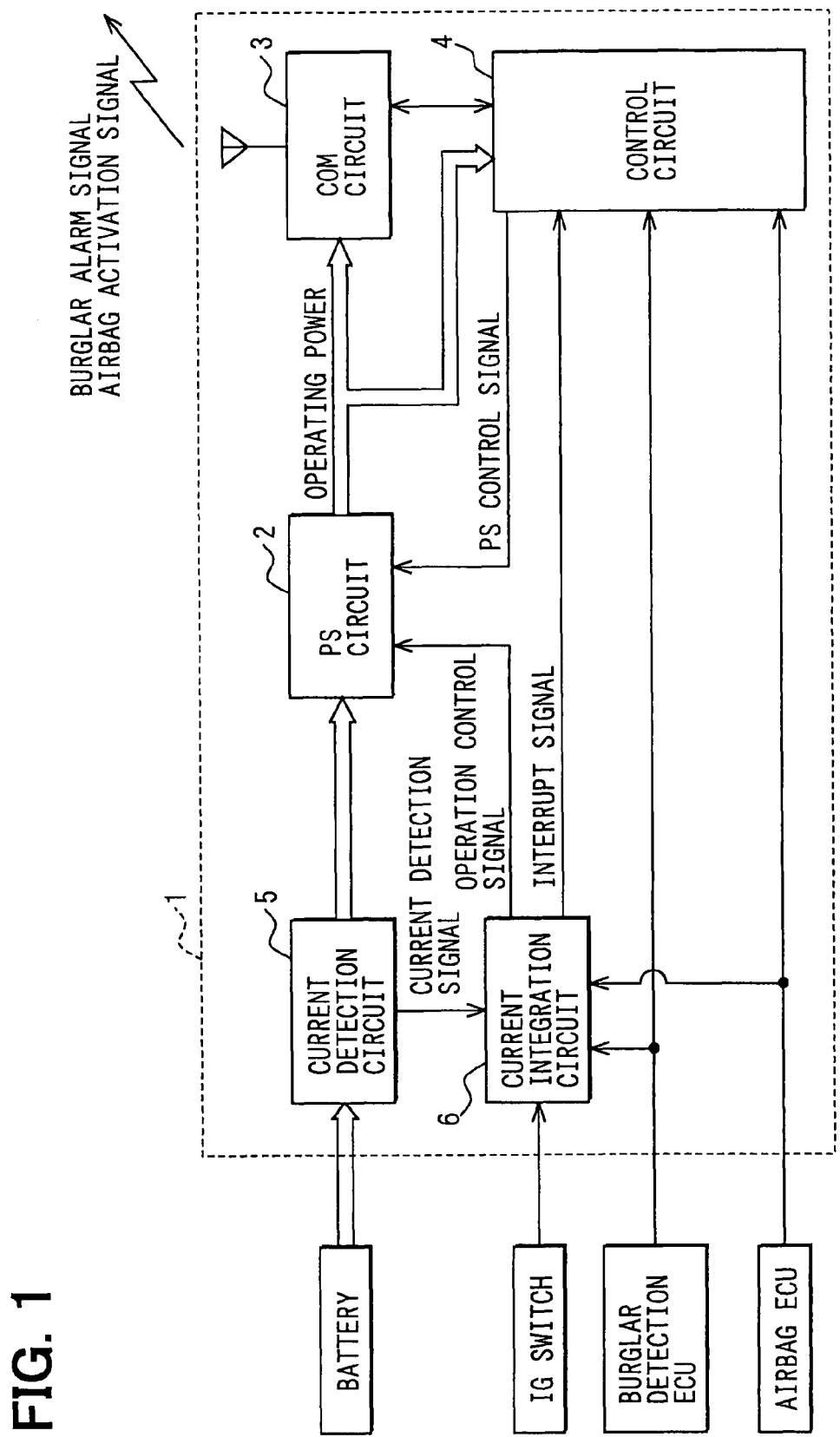
FIG. 1 is a block diagram of an onboard wireless communication system according to the first embodiment of the present invention.

The preferred embodiments of the present invention will be explained with reference to the accompanying drawings. In the drawings, the same numerals are used for the same components and devices.

First Embodiment

Referring to FIG. 1, an onboard wireless communication system 1 includes a power supply (PS) circuit 2, a wireless communication (COM) circuit 3, a control circuit 4, a current detection circuit 5, and a current integration circuit 6. The power supply circuit 2 supplies operating power from a battery to the wireless communication circuit 3 and the control circuit 4. The control circuit 4 controls operation of the wireless communication circuit 3 with power supplied by the power supply circuit 2.

For instance, the control circuit 4 issues an instruction to the wireless communication circuit 3 for transmitting a burglar alarm signal, which is an emergency report signal, from the wireless communication circuit 3 to a service center when it has received a burglar detection signal from a burglar detection ECU. The burglar alarm signal indicates a possible burglary. The control circuit 4 controls the wireless communication circuit 3 to transmit an airbag activation signal to the service center when it has received an airbag detection signal from an airbag ECU. The airbag activation signal indicates an activation of an airbag.

The current detection circuit 5 outputs a current detection signal when current is fed from the battery. The current integration circuit 6 monitors a start of battery discharge by monitoring an ignition signal outputted from an ignition (IG) switch. It also calculates an integration value of the current fed from the battery to the current detection circuit 5 based on the current detection signal as a consumption current of the onboard wireless communication system 1. Then, it compares the calculated current integration value with the first reference value or the second reference value, and starts outputting an interrupt signal or stop outputting an operation control signal.

The control circuit 4 stops outputting a power supply control signal when the interrupt signal is inputted from the current integration circuit 6. The power supply circuit 2 stops power supply to the wireless communication circuit 3 when the power supply control signal from the control circuit 4 is stopped. The power supply circuit 2 also stops it operation when the operation signal from the current integration circuit 6 is stopped. The current integration circuit 6 starts outputting the operation control signal when the ignition signal from IG switch is outputted. The power supply circuit 2 starts its operation when the operation signal from the current integration circuit 6 is outputted.

Figure 2:
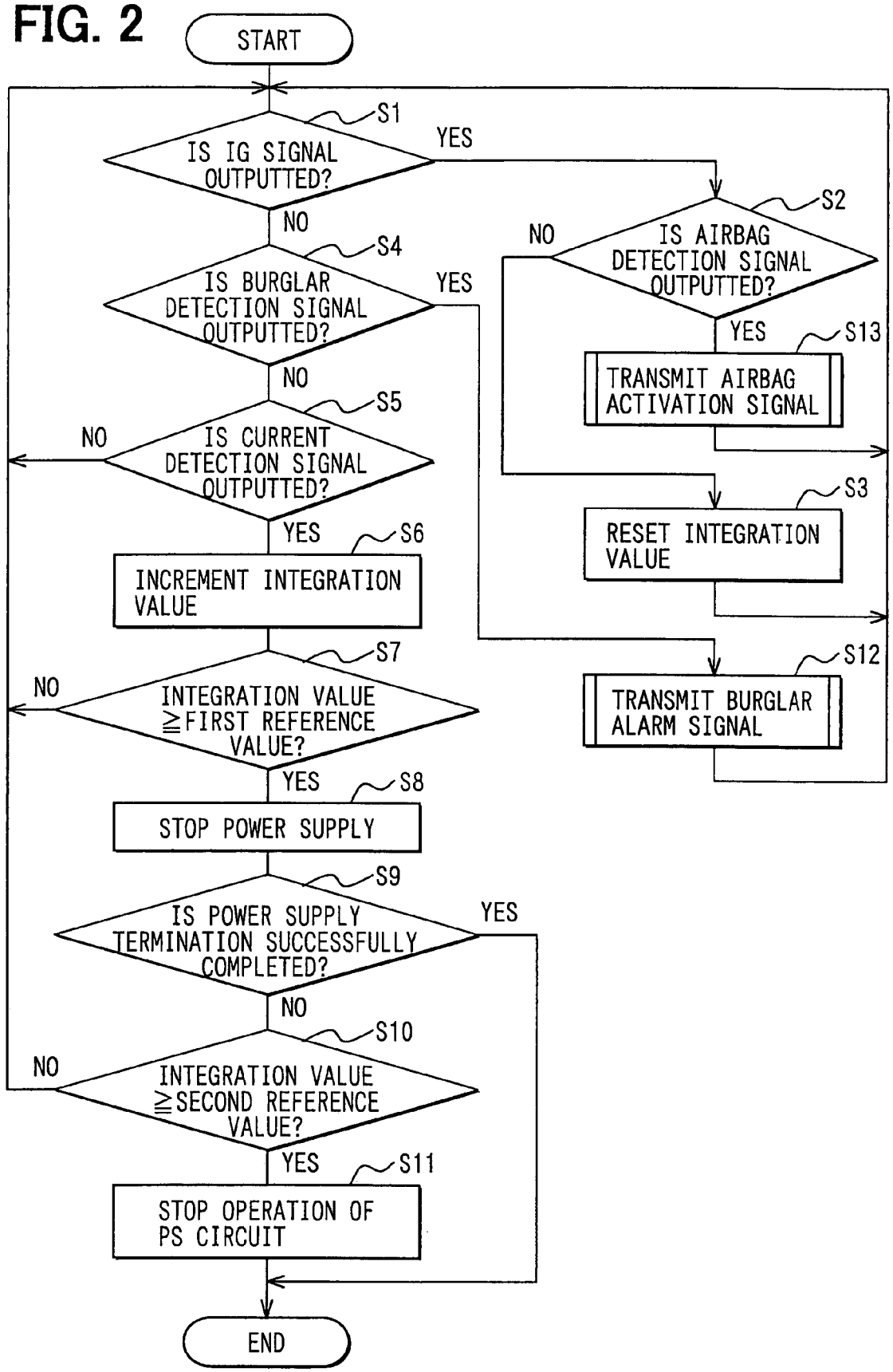
FIG. 2 is a flowchart of a process performed by the wireless communication system according to the first embodiment.

A process performed by the wireless communication system 1 is shown in FIG. 2. The current integration circuit 6 determines whether the ignition signal is outputted from the IG switch (S1). If so, it determines whether the airbag detection signal is outputted from the airbag ECU (S2). If the airbag detection signal is not detected, it clears the current integration value at that point (S3) and the wireless communication system 1 returns to step S1.

If the ignition signal is not detected at step S1, the current integration circuit 6 determines whether the burglar detection signal is outputted from the burglar detection ECU (S4). If not, it determines whether the current detection signal is outputted from the current detection circuit 5 (S5). If the current detection signal is not detected at step S5, the wireless communication system 1 returns to step S1.

If the current detection signal is detected before the burglar detection signal is detected (YES at step S5), the current integration circuit 6 increments the current integration value (S6). The current integration circuit 6 determines whether the current integration value is larger than the first reference value (S7). If not, the wireless communication system 1 returns to step S1.

If the current integration value is equal to or larger than the first reference value, the current integration circuit 6 outputs the interrupt signal. Then, the control circuit 4 stops outputting the power supply control signal for terminating power supply from the power supply circuit 2 to the wireless communication circuit 3 (S8). The wireless communication system then determines whether the termination of power supply from the power supply circuit 2 to the wireless communication circuit 3 is successfully completed (S9). This step is performed to detect a failure to stop the power supply from the power supply circuit 2 to the wireless communication circuit 3. If the power supply termination is successfully completed, it completes this process.

If the termination of the power supply is not successfully completed, that is, the failure is detected, the current integration circuit 6 determines whether the current integration value is equal to or larger than the second reference value (S10). If not, the wireless communication system 1 returns to step S1.

If the current integration value is equal to or larger than the second reference value, the current integration circuit 6 stops outputting the operation control signal to stop the operation of the power supply circuit 2 (S11). Then, the wireless communication system 1 completes the process.

If the burglar detection signal is detected while the current integration value is still smaller than the first reference value (YES at step S4), the wireless communication circuit 3 transmits the burglar alarm signal to the service center based on an instruction from the control circuit 4 (S12). The wireless communication system 1 returns to step S1 after the transmission of the burglar alarm signal is completed.

If the airbag detection signal is detected before the turn-off of the ignition switch is detected (YES at step S2), the wireless communication circuit 3 transmits the airbag activation signal to the service center based on an instruction from the control circuit 4 (S13). The wireless communication system 1 returns to step S1 after the transmission of the airbag activation signal is completed.

The current integration circuit 6 temporarily stops the calculation of the current integration value until the transmission of the burglar alarm signal is completed when the burglar detection signal is detected while the current integration value is still smaller than the first reference value after the ignition switch is turned off. Namely, the power supply from the power supply circuit 2 to the wireless communication circuit 3 is maintained and the power supply does not stop during the transmission of the burglar alarm signal to the service center. As a result, the transmission of the burglar alarm signal is properly transmitted to the service center. If the current integration value is equal to or larger than the first reference value while the burglar detection signal is still not detected, the power supply from the power supply circuit 2 to the wireless communication circuit 3. Thus, the battery is properly protected from the exhaustion.

With this configuration, the transmission of the burglar alarm signal and the protection of the battery are flexibly performed, that is, such operations are performed as preferred by the user. The wireless communication system 1 draws the current from the battery and calculates the current integration value from the current. Thus, the wireless communication system 1 can calculate the consumption current with high accuracy. Moreover, the current integration circuit 6 is provided separately from the control circuit 4, that is, it can be constructed in a low power consumption configuration even when the control circuit 4 cannot be constructed in such a configuration. Therefore, the current integration circuit 6 can perform the current integration value calculation with low power consumption and therefore the power consumption of the wireless communication system 1 can be maintained low.

Furthermore, the operation of the power supply circuit 2 is stopped when the current integration value exceeds the second reference value even if the termination of the power supply form the power supply circuit to the wireless communication circuit 3 is failed. As a result, the battery is properly protected from exhaustion even when the control circuit 4 loses control of the power supply circuit 2 due to a malfunction of a CPU. The detection of the burglar detection signal is performed immediately after the turn-off of the ignition switch is detected, that is, immediately after the battery starts discharging. Thus, the burglar alarm signal is properly transmitted even immediately after the battery starts discharging.

Second Embodiment

Figure 3:
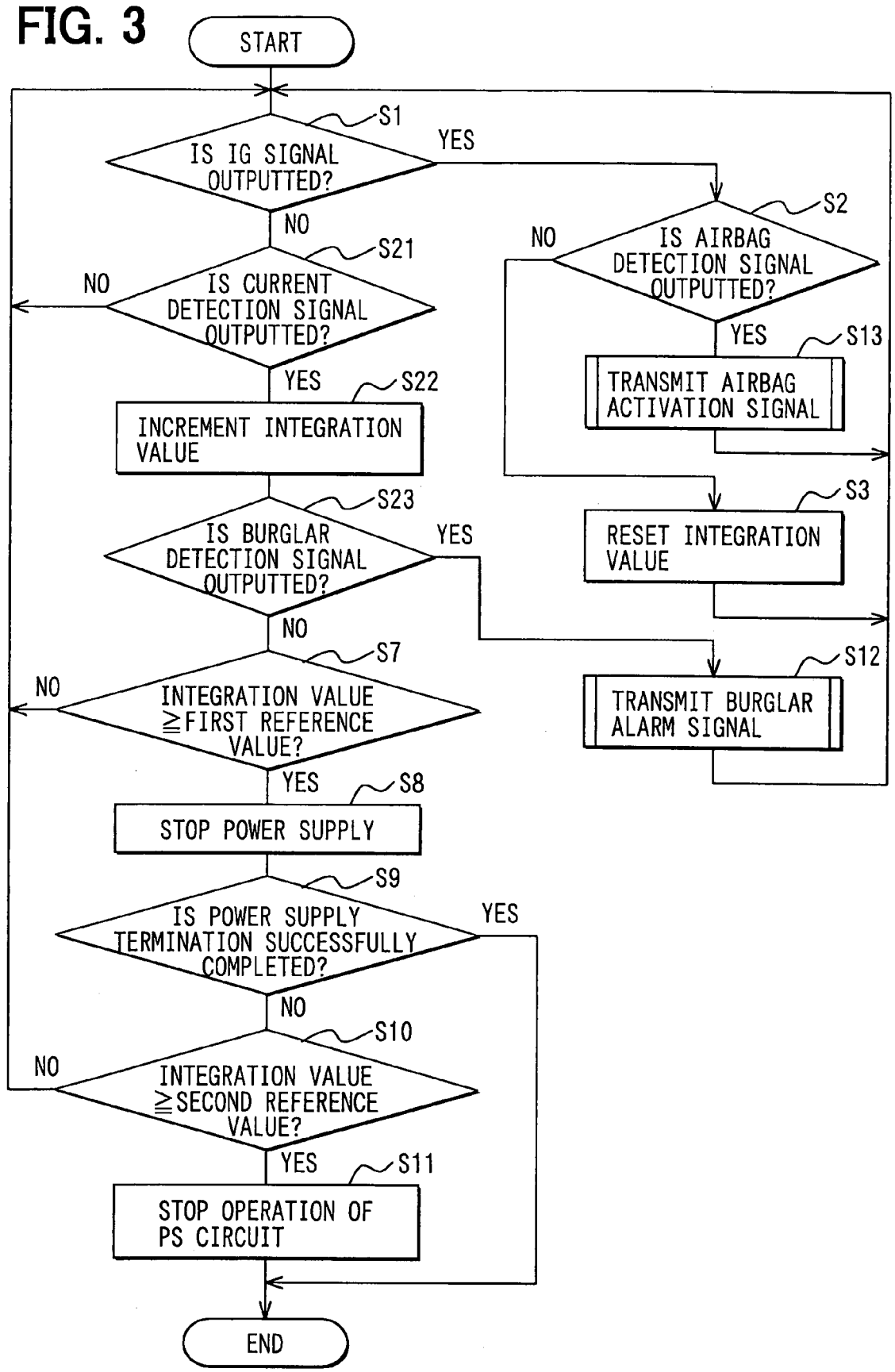
FIG. 3 is a flowchart of a process performed by the wireless communication system according to the second embodiment of the present invention.

The second example of a process performed by the onboard wireless communication system 1 is shown in FIG. 3. Steps indicated with the same numerals with the first embodiment are performed in the same manner as the first embodiment. In comparison with the first embodiment, steps after the signal indicating the turn-off of the ignition switch is detected are different.

The current integration circuit 6 determines whether the current detection signal is outputted from the current detection circuit 5 (S21) after the turn-off of the ignition switch is detected (YES at step S1). If so, the current integration circuit 6 increments the current integration value (S22).

The control circuit 4 determines whether the burglar detection signal is outputted from the burglar detection ECU (S23) and whether the current integration value is equal to or larger than the first reference value (S7). If the current detection signal is not detected and the current integration value is smaller than the first reference value, the wireless communication system 1 returns to step S1.

The current integration circuit 6 temporarily stops integration of the current until the transmission of the burglar alarm signal is completed when the burglar detection signal is detected while the current integration value is still smaller than the first reference value after the ignition switch is turned off. Namely, the power supply from the power supply circuit 2 to the wireless communication circuit 3 is maintained and the power supply does not stop during the transmission of the burglar alarm signal to the service center. As a result, the burglar alarm signal is properly transmitted to the service center. If the current integration value exceeds the first reference value before the burglar detection signal is detected, the power supply from the power supply circuit 2 to the wireless communication circuit 3. Thus, the battery is properly protected from the exhaustion.

Third Embodiment

Figure 4:
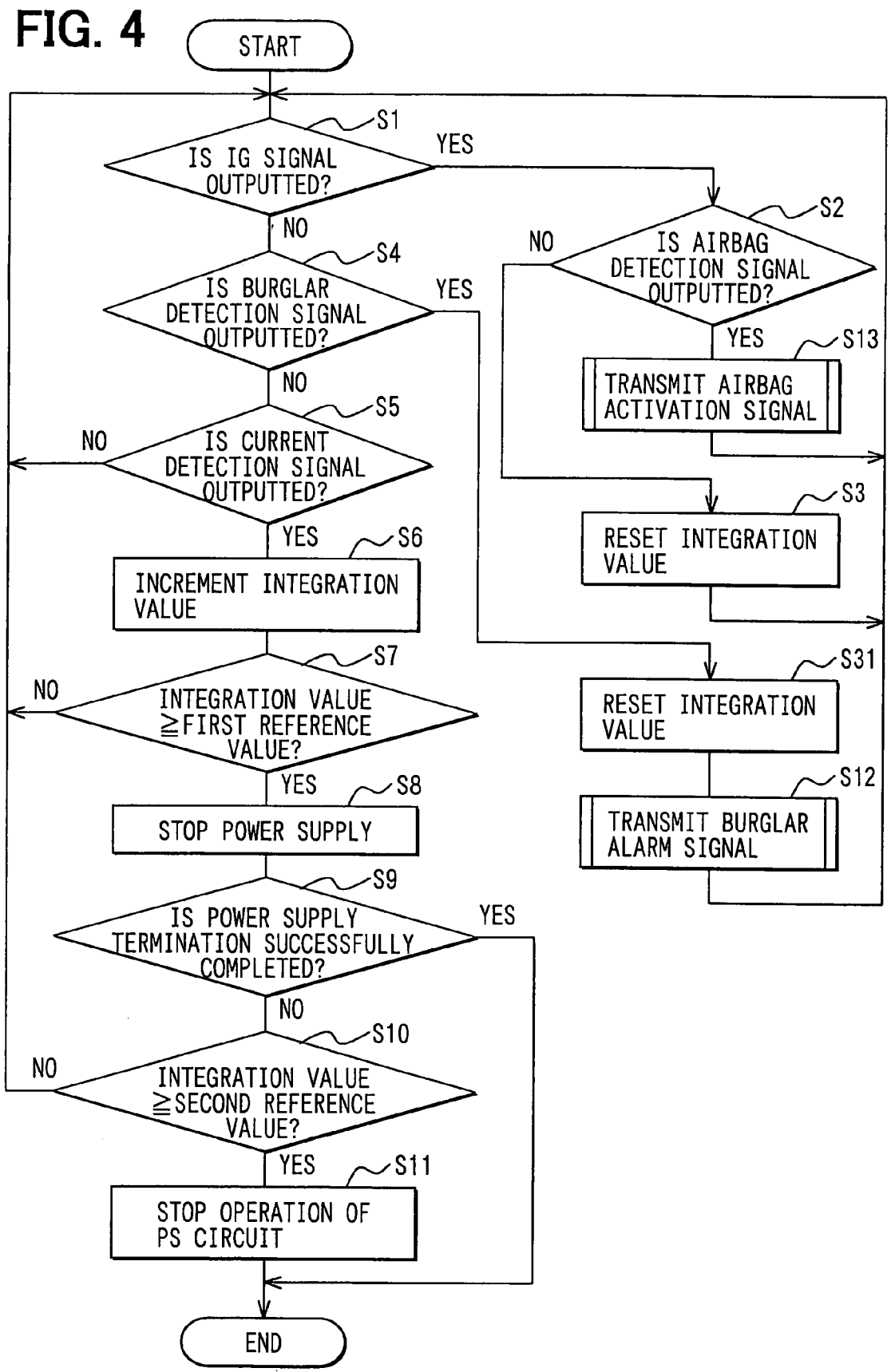
FIG. 4 is a flowchart of a process performed by the wireless communication system according to the third embodiment of the present invention.

The third example of a process performed by the onboard wireless communication system 1 is shown in FIG. 4. Steps indicated with the same numerals with the first embodiment are performed in the same manner as the first embodiment. In comparison with the first embodiment, steps after the burglar detection signal is detected are different.

The current integration circuit 6 clears the current integration value at that time (S31) when the burglar detection signal is detected while the current integration value is still smaller than the first reference value (YES at step S4). The wireless communication circuit 3 transmits the burglar alarm signal to the service center based on an instruction from the control circuit (S12). The wireless communication system 1 returns to step S1 after the transmission of the burglar alarm signal is completed.

The wireless communication circuit 3 transmits the burglar alarm signal to the service center after the current integration circuit 6 has cleared the current integration value at that time when the burglar detection signal is detected. Namely, a period of power supply from the power supply circuit 2 to the wireless communication circuit 3 after the completion of the burglar alarm signal transmission is extendable. Therefore, the wireless communication system 1 can remain on for receiving a tracing signal from the service center and proper steps can be performed for the burglar alarm. The current integration value may be cleared after the transmission of the burglar alarm signal to the service center from the wireless communication circuit 3.

Fourth Embodiment

Figure 5:
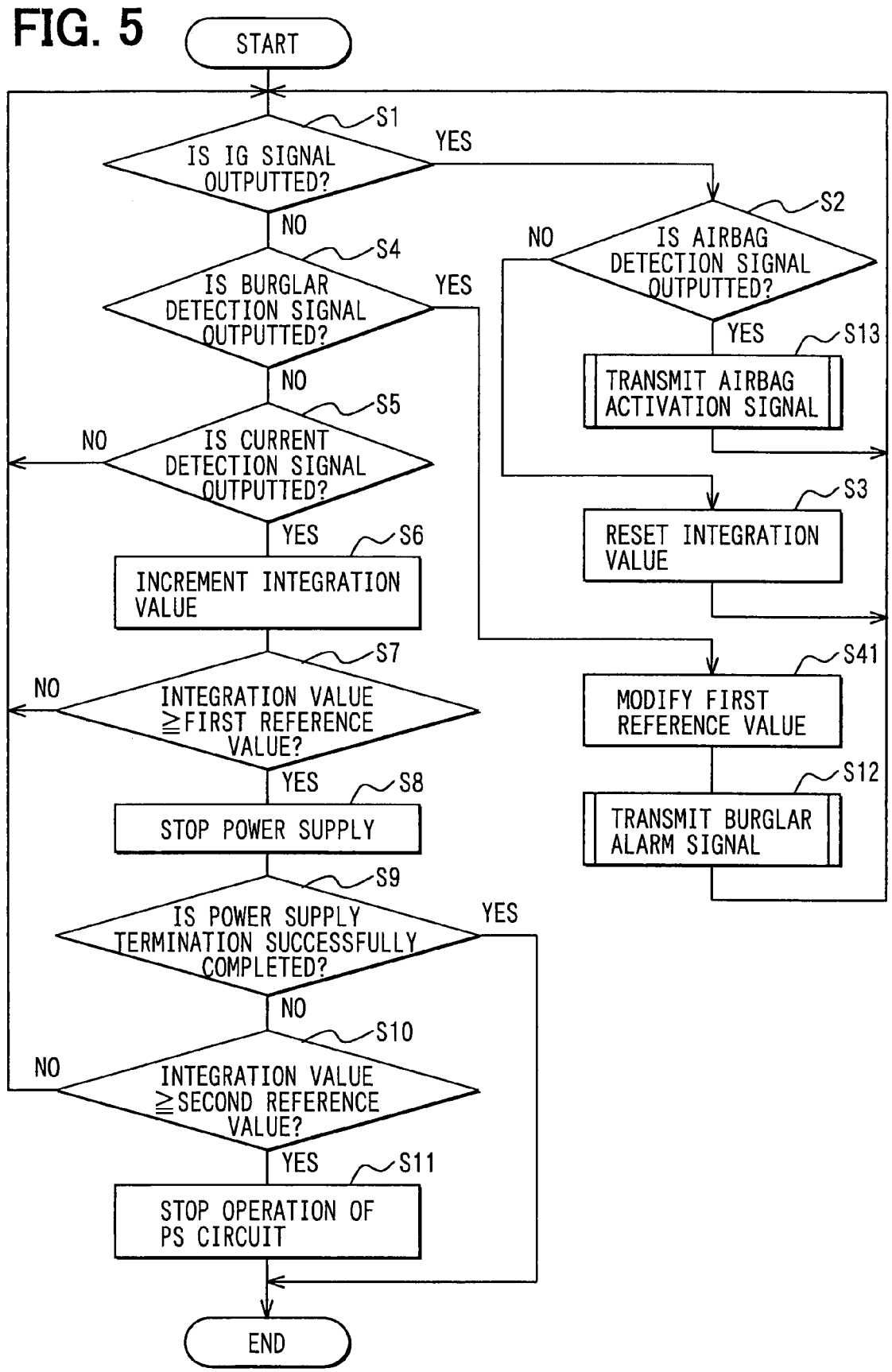
FIG. 5 is a flowchart of a process performed by the wireless communication system according to the fourth embodiment of the present invention.

The fourth example of a process performed by the onboard wireless communication system 1 is shown in FIG. 5. Steps indicated with the same numerals with the first embodiment are performed in the same manner as the first embodiment. In comparison with the first embodiment, steps after the burglar detection signal is detected are different.

The current integration circuit 6 modifies the first reference value (S41) when the burglar detection signal is detected while the current integration value is still smaller than the first reference value (YES at step S4). The wireless communication circuit 3 transmits the burglar alarm signal to the service center based on an instruction from the control circuit (S12). The wireless communication system 1 returns to step S1 after the transmission of the burglar alarm signal is completed.

The wireless communication circuit 3 transmits the burglar alarm signal to the service center after the current integration circuit 6 has modified the first reference value when the burglar detection signal is detected. Namely, a period of power supply from the power supply circuit 2 to the wireless communication circuit 3 after the completion of the burglar alarm signal transmission is extendable by modifying the first reference value. Therefore, the wireless communication system 1 can remain on for receiving a tracing signal from the service center and proper steps can be performed for the burglar alarm. The first reference value may be modified after the transmission of the burglar alarm signal to the service center from the wireless communication circuit 3.

Fifth Embodiment

Figure 6:
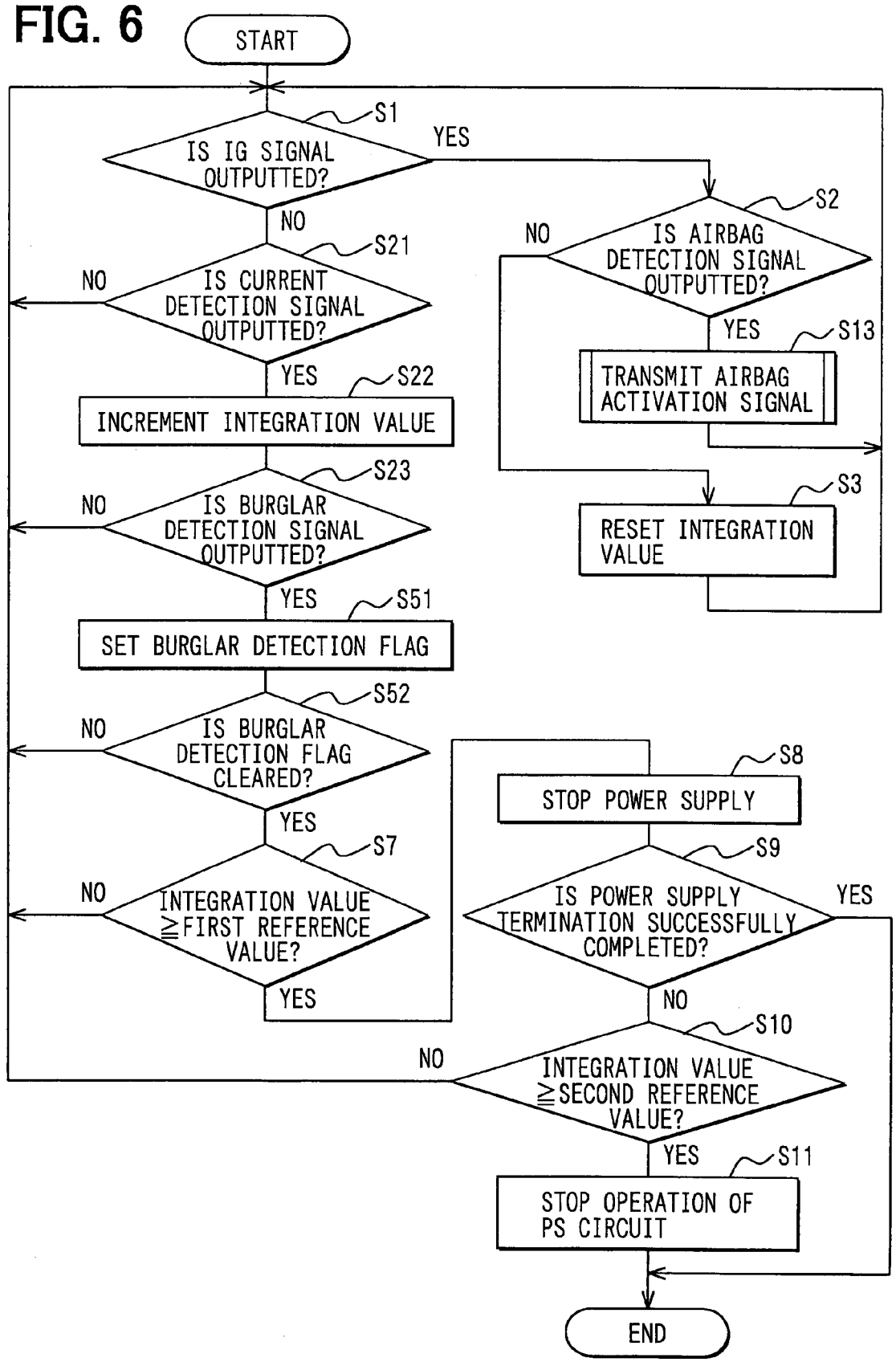
FIG. 6 is a flowchart of a process performed by the wireless communication system according to the fifth embodiment of the present invention.
Figure 7:
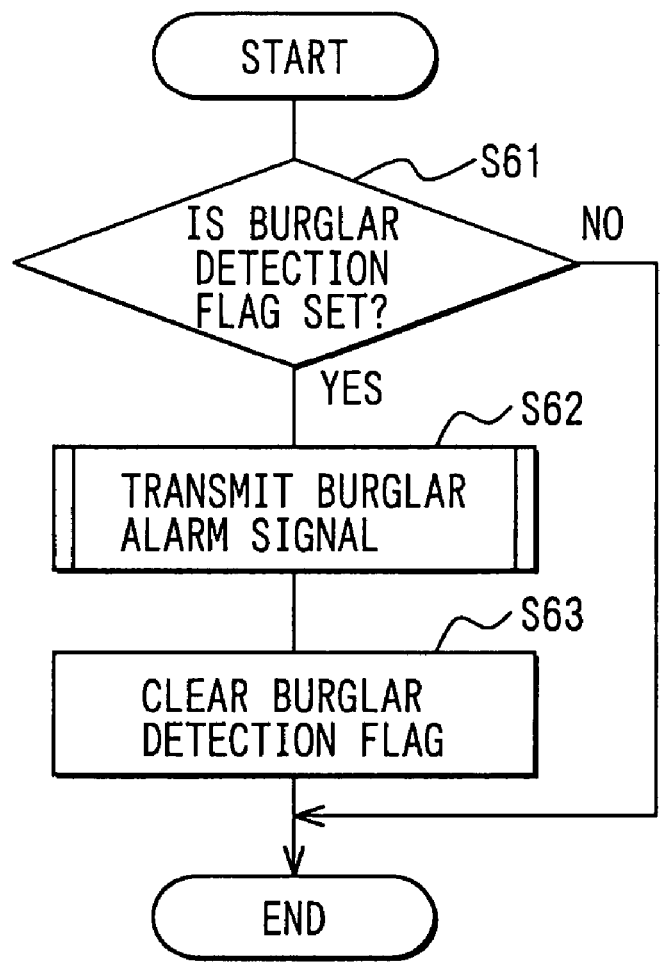
FIG. 7 is a flowchart of a subroutine of the process shown in FIG. 6 according to the fifth embodiment.

The fifth example of a process performed by the onboard wireless communication system 1 is shown in FIGS. 6 and 7. Steps indicated with the same numerals with the third embodiment are performed in the same manner as the third embodiment. In comparison with the third embodiment, steps after the burglar detection signal is detected are different.

The wireless communication system 1 sets a burglar detection flag (S51) when the burglar detection signal is detected and executes a burglar alarm transmission task. It determines whether the burglar detection flag is set (S61). If so, the wireless communication circuit 3 transmits the burglar alarm signal to the service center based on an instruction from the control circuit 4 (S62). Then, the wireless communication system 1 clears the burglar detection flag (S63). It determines whether the burglar detection flag is cleared (S52). If so, it performs steps S7 through S11.

The determination of the current integration value whether it is equal to or larger than the first reference value is halted when the burglar detection signal is detected after the ignition switch is turned off and the battery starts discharging. Namely, the power supply from the power supply circuit 2 to the wireless communication circuit 3 is maintained. As a result, the power supply is maintained during the transmission of the burglar alarm signal and therefore the transmission of the burglar alarm signal is properly transmitted to the service center. The power supply is stopped based on an instruction from the control circuit 4 when the current integration value exceeds the first reference value. Thus, the battery is properly protected from exhaustion.

Sixth Embodiment

Figure 8:
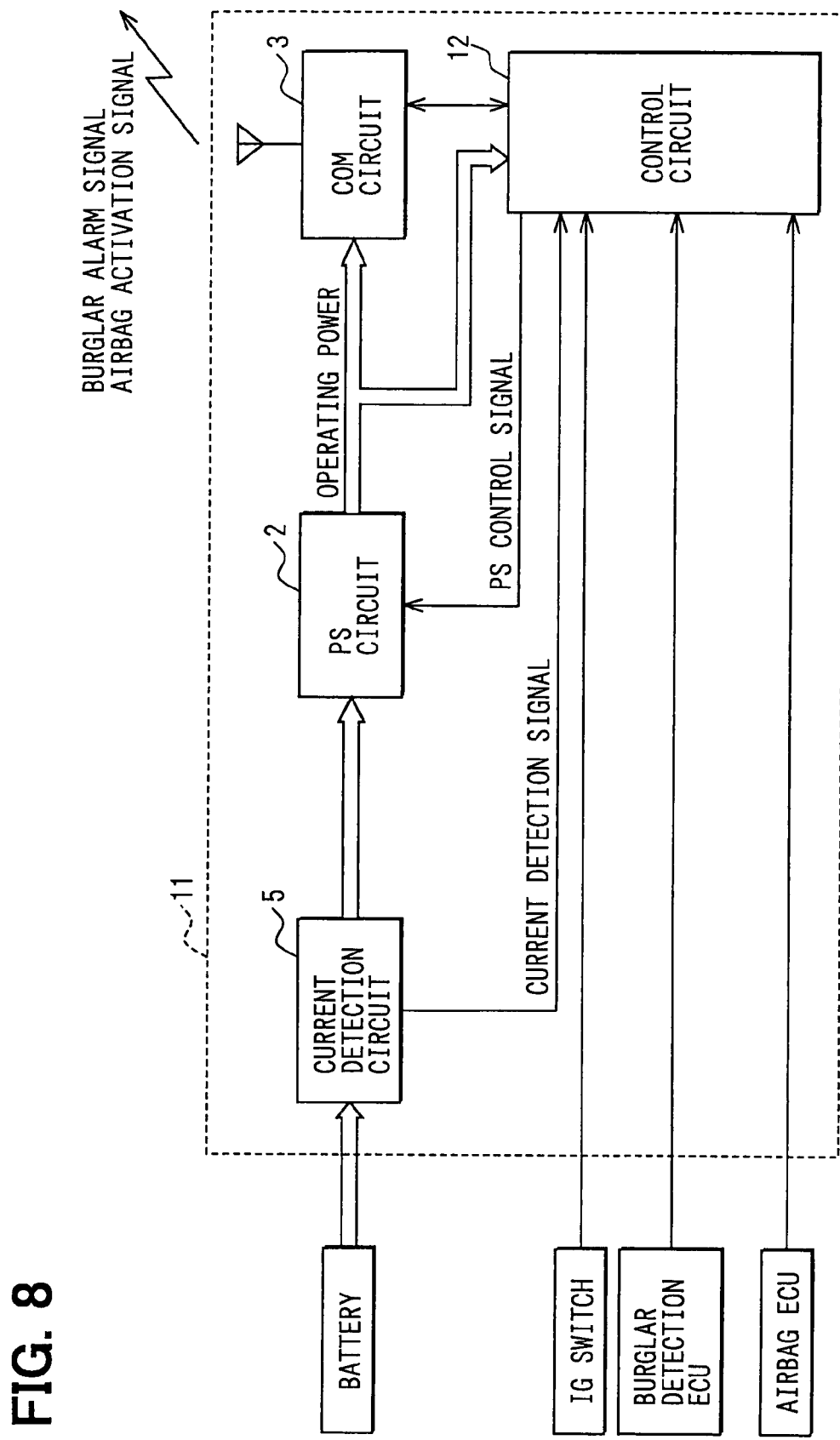
FIG. 8 is a block diagram of an onboard wireless communication system according to the sixth embodiment of the present invention.

Referring to FIG. 8, an onboard wireless communication system 11 includes the power supply circuit 2, the wireless communication circuit 3, the current detection circuit 5, and a control circuit 12. Configurations and operations of the power supply circuit 2, the wireless communication circuit 3, and the current detection circuit 5 are the same as those described in the first embodiment. Therefore, they will not be discussed. The functions of the current integration circuit 6 of the first embodiment are included in the control circuit 12.

The control circuit 12 calculates an integration value of the current fed from the battery to the current detection circuit 5 based on the current detection signal as a consumption current of the onboard wireless communication system 11. Then, it compares the calculated current integration value with a reference value, and stops outputting the power supply control signal.

Figure 9:
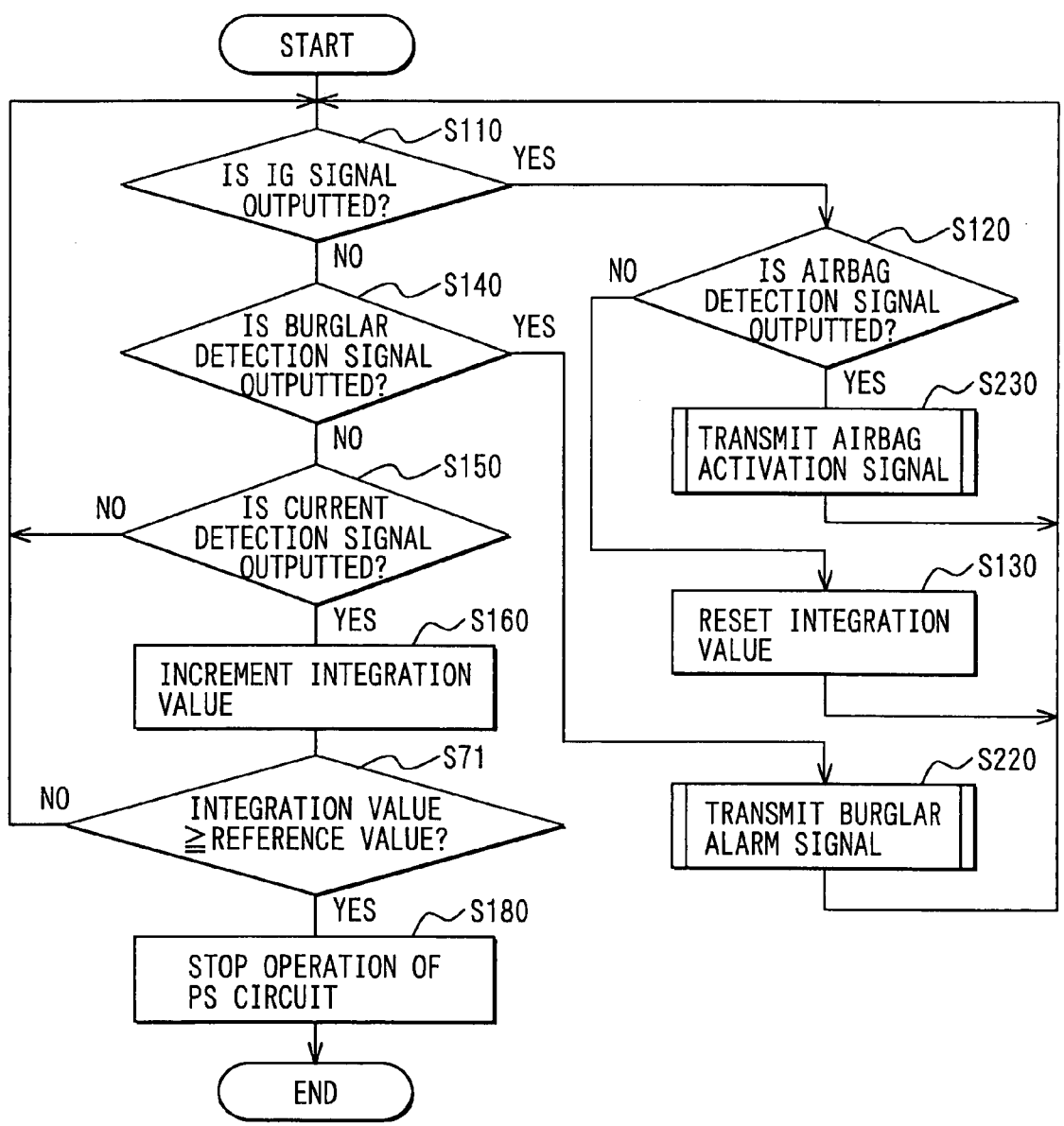
FIG. 9 is a flowchart of a process performed by the wireless communication system according the sixth embodiment.

A process performed by the onboard wireless communication system 11 is shown in FIG. 9. The control circuit 12 determines whether the IG signal is outputted (S110). If so, it determines whether the airbag detection signal is outputted (S120). If the airbag detection signal is detected, the wireless communication circuit 3 transmits the airbag activation signal to the service center (S230). If the airbag detection signal is not detected, the control circuit 12 clears the current integration value (S130).

If the IG signal is not detected (NO at step S110), it determines whether a burglar detection signal is outputted (S140). If the burglar detection signal is detected, the wireless communication circuit 3 transmits the burglar alarm signal to the service center (S220). If the burglar detection signal is not detected, the control circuit 12 determines whether the current detection signal is outputted (S150).

If the current detection signal is detected, the control circuit 12 increments the current integration value (S160). Then, it determines whether the current integration value is equal to or larger than the reference value (S71). If so, the control circuit 12 stops outputting the power supply control signal and the power supply circuit 2 stops the power supply to the wireless communication circuit 3 based on an instruction from the control circuit (S180). Then, the wireless communication system 11 completes the process. If the current integration value is smaller than the reference value (NO at step S71), the wireless communication system 11 returns to step S110.

The control circuit 12 temporarily stops integration of the current until the transmission of the burglar alarm signal is completed when the burglar detection signal is detected while the current integration value is still smaller than the reference value after the ignition switch is turned off. Namely, the power supply from the power supply circuit 2 to the wireless communication circuit 3 is maintained and the power supply does not stop during the transmission of the burglar alarm signal to the service center. As a result, the burglar alarm signal is properly transmitted to the service center. If the current integration value exceeds the reference value before the burglar detection signal is detected, the power supply from the power supply circuit 2 to the wireless communication circuit 3. Thus, the battery is properly protected from the exhaustion.

With this configuration, the transmission of the burglar alarm signal and the protection of the battery are flexibly performed, that is, such operations are performed as preferred by the user. Moreover, the functions of the current integration circuit 6 of the first embodiment are included in the control circuit 12, that is, the current integration circuit 6 is not required. Thus, the configuration of the wireless communication system 11 is simpler than that of the wireless communication system 1 and the cost of the wireless communication system 11 is lower than that of the wireless communication system 1.

Furthermore, the detection of the burglar detection signal is performed immediately after the IG switch is turned off, that is, the battery stars discharging. Therefore, the burglar alarm signal is properly transmitted even immediately after the battery starts discharging.

Seventh Embodiment

Figure 10:
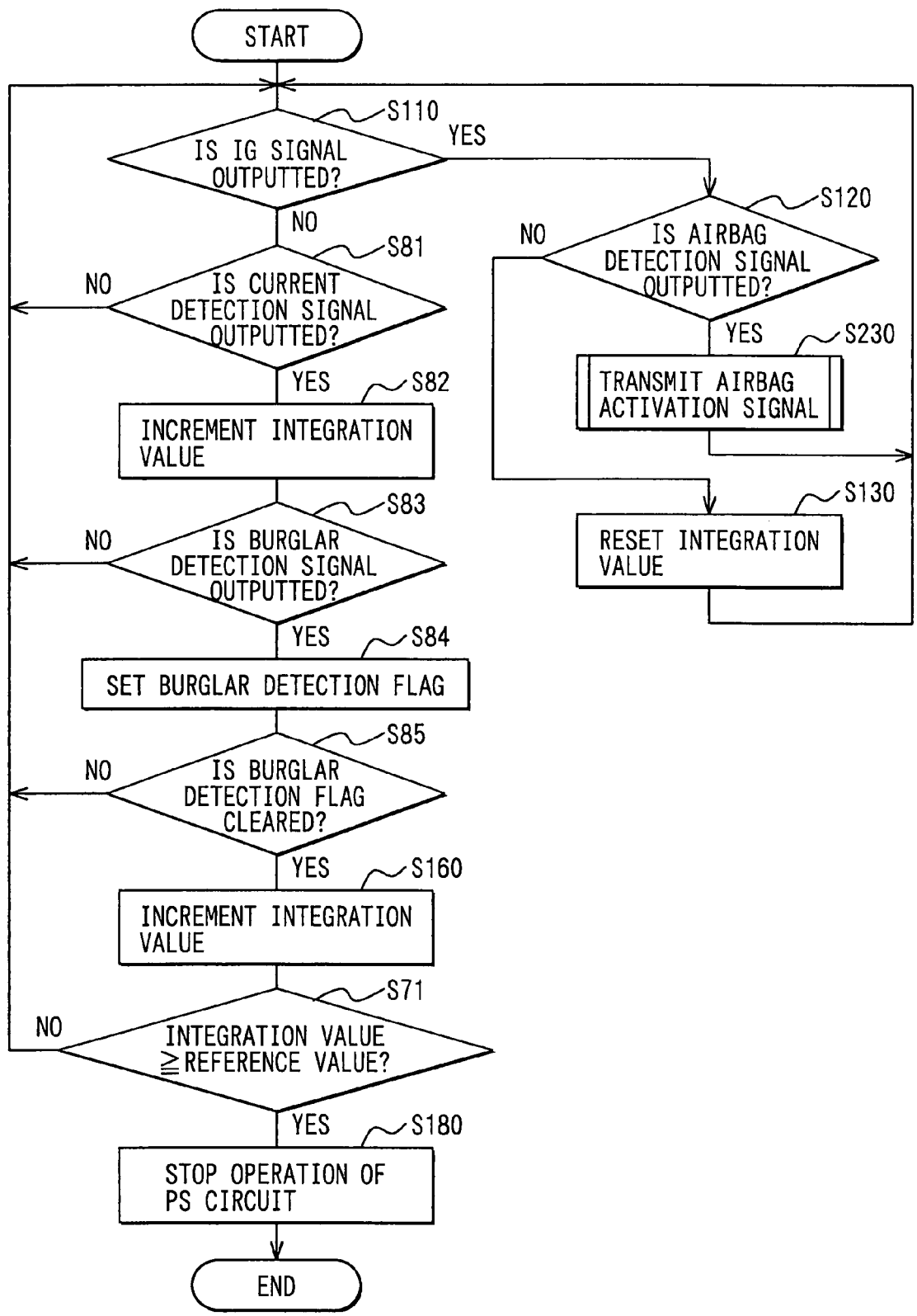
FIG. 10 is a flowchart of a process performed by the wireless communication system according the seventh embodiment.

Another example of a process performed by the onboard wireless communication system 11 is shown in FIG. 10. Steps indicated with the same numerals with the sixth embodiment are performed in the same manner as the sixth embodiment. In comparison with the sixth embodiment, steps after the turn-off the IG switch is detected and steps after the burglar detection signal is detected are different.

The control circuit 12 determines whether the current detection signal is outputted from the current detection circuit 5 (S81) when the turn-off the IG switch is detected (YES at step S100). If so, the control circuit 12 increments the current integration value (S82).

The control circuit 12 determines whether the burglar detection signal is outputted from the burglar detection ECU (S83). If so, the control circuit 12 sets the burglar detection flag (S84) and executes the burglar alarm transmission task in the same manner as the fifth embodiment. In this task, the wireless communication circuit 3 transmits the burglar alarm signal to the service center based on an instruction from the control circuit 12 and the control circuit 12 clears the burglar detection flag. The control circuit determines whether the burglar detection flag is cleared (S85). The wireless communication system 11 performs steps S160 through S180 when the burglar detection flag is cleared.

The control circuit 12 temporarily stops integration of the current until the transmission of the burglar alarm signal is completed when the burglar detection signal is detected while the current integration value is still smaller than the reference value after the ignition switch is turned off. Namely, the power supply from the power supply circuit 2 to the wireless communication circuit 3 is maintained and the power supply does not stop during the transmission of the burglar alarm signal to the service center. As a result, the burglar alarm signal is properly transmitted to the service center. If the current integration value is equal to or larger than the reference value while the burglar detection signal is still not detected, the power supply from the power supply circuit 2 to the wireless communication circuit 3. Thus, the battery is properly protected from the exhaustion.

The present invention should not be limited to the embodiment previously discussed and shown in the figures, but may be implemented in various ways without departing from the spirit of the invention. For example, the start of the battery discharge may be detected by determining whether an accessory is turned off. Another emergency information signal may be transmitted to the service center. An emergency information signal may be transmitted to the service center through an operation of an emergency switch installed in a passenger compartment of the vehicle by the user.

The termination of the power supply from the power supply circuit 2 to the wireless communication circuit 3 may be reported to the service center prior to the actual termination of the power supply. The second and the third embodiments can be combined. In this case, the wireless communication system 1 determines whether the burglar detection signal is outputted form the burglar detection ECU after the current integration value is incremented. If the burglar detection signal is detected, it transmits the burglar alarm signal to the service center after resetting the current integration value.

The second and the fourth embodiments can be combined. In this case, the wireless communication system 1 determines whether the burglar detection signal is outputted from the burglar detection ECU after the current integration value is incremented. If the burglar detection signal is detected, it transmits the burglar alarm signal to the service center after modifying the first reference value.

The third and the fourth embodiments can be combined. In this case, the wireless communication system 1 transmits the burglar alarm signal to the service center after resetting the current integration value and modifying the first reference value.

The second and the sixth embodiments can be combined. In this case, the wireless communication system 11 determines whether the burglar detection signal is outputted from the burglar detection ECU after incrementing the current integration value.

The third and the sixth embodiments can be combined. In this case, the wireless communication system 11 transmits the burglar alarm signal to the service center after resetting the current integration value. The fourth and the sixth embodiments can be combined. In this case, the wireless communication system 11 transmits the burglar alarm signal to the service center after modifying the reference value.

What is claimed is:

1. An onboard wireless communication system for a vehicle, comprising:
    wireless communication means for transmitting a signal out of the vehicle;
    power supply means for supplying power from a battery of the vehicle to the wireless communication means; and
    control means for controlling the wireless communication means and the power supply means, wherein:
    the control means lets the wireless communication means to transmit the signal out of the vehicle when the control means receives an external signal, which is originated outside of the onboard wireless communication system and is triggered by an unauthorized break-in of the vehicle, in a state where the power supply means maintains the supplying of the power, from the battery to the wireless communication means;
    the control means calculates a cumulative amount of current fed from the battery to the wireless communication means since turning off an ignition key of the vehicle;
    when the calculated cumulative amount becomes equal to or larger than a reference value, the control means lets the power supply means to stop the supplying of the power from the battery to the wireless communication means except time of receiving the external signal; and
    when the control means receives the external signal, the control means lets the power supply means to maintain the supplying of the power from the battery to the wireless communication means at least until completion of the transmission of the signal from the wireless communication means.

2. The onboard wireless communication system according to claim 1, wherein when the control means receives the external signal, the control means stops an increase in the calculated cumulative amount at least until the completion of the transmission of the signal from the wireless communication means.

3. The onboard wireless communication system according to claim 1, wherein the control means resets the calculated cumulative amount when the control means receives the external signal before reaching of the calculated cumulative amount to the reference value.

4. The onboard wireless communication system according to claim 1, wherein the control means raises the reference value when the control means receives the external signal before reaching of the calculated cumulative amount to the reference value.

5. The onboard wireless communication system according to claim 1, wherein when the control means determines that the power supply means fails the stopping of the supplying of the power from the battery to the wireless communication means, the control means stops the power supply means after reaching of the calculated cumulative amount to a second reference value, which is larger than the reference value.

6. The onboard wireless communication system according to claim 1, wherein:
    the control means determines whether the calculated cumulative amount is equal to or larger than the reference value to see whether the calculated cumulative amount becomes equal to or larger than the reference value; and
    the control means halts the determining of whether the calculated cumulative amount is equal to or larger than the reference value when the control means receives the external signal before reaching of the calculated cumulative amount to the reference value.

7. An onboard wireless communication system for a vehicle, comprising:
- a wireless communication device that transmits a signal out of the vehicle;
- a power supply device that supplies power from a battery of the vehicle to the wireless communication device; and
- a controller that controls the wireless communication device and the power supply device, wherein:
- the controller lets the wireless communication device to transmit the signal out of the vehicle when the controller receives an external signal, which is originated outside of the onboard wireless communication system and is triggered by an unauthorized break-in of the vehicle, in a state where the power supply device maintains the supplying of the power from the battery to the wireless communication device;
- the controller calculates a cumulative amount of current fed from the battery to the wireless communication device since turning off of an ignition key of the vehicle;
- when the calculated cumulative amount becomes equal to or larger than a reference value, the controller lets the power supply device to stop the supplying of the power from the battery to the wireless communication device except time of receiving the external signal; and
- when the controller receives the external signal, the controller lets the power supply device to maintain the supplying of the power from the battery to the wireless communication device at least until completion of the transmission of the signal from the wireless communication device.

8. The onboard wireless communication system according to claim 7, wherein:
- the controller includes:
  - a current monitoring device that calculates the cumulative amount; and
  - a control device that is provided separately from the current monitoring device and controls the wireless communication device and the power supply device;
- when the calculated cumulative amount becomes equal to or larger than the reference value, the current monitoring device provides a notification to the control device, so that the control device lets the power supply device to stop the supplying of the power from the battery to the wireless communication device except the time of receiving the external signal; and
- when the current monitoring device receives the external signal before reaching of the calculated cumulative amount of the reference value, the current monitoring device stops an increase in the calculated cumulative amount at least until the completion of the transmission of the signal from the wireless communication device.

9. The onboard wireless communication system according to claim 7, wherein:
- the controller includes:
  - a current monitoring device the calculates the cumulative amount; and
  - a control device that is provided separately from the current monitoring device and controls the wireless communication device and the power supply device;
- when the calculated cumulative amount becomes equal to or larger than the reference value, the current monitoring device provides a notification to the control device, so that the control device lets the power supply device to stop the supplying of the power from the battery to the wireless communication device except the time of receiving the external signal; and
- when the current monitoring device receives the external signal before reaching of the calculated cumulative amount to the reference value, the current monitoring device resets the calculated cumulative amount.

10. The onboard wireless communication system according to claim 7, wherein:
- the controller includes:
  - a current monitoring device that calculates the cumulative amount; and
  - a control device that is provided separately from the current monitoring device and controls the wireless communication device and the power supply device;
- when the calculated cumulative amount becomes equal to or larger than the reference value, the current monitoring device provides a notification to the control device, so that the control device lets the power supply device to stop the supplying of the power from the battery to the wireless communication device except the time of receiving the external signal; and
- when the current monitoring device receives the external signal before reaching of the calculated cumulative amount to the reference value, the current monitoring device raises the reference value.

11. The onboard wireless communication system according to claim 7, wherein:
- the controller includes:
  - a current monitoring device that calculates the cumulative amount; and
  - a control device that is provided separately from the current monitoring device and controls the wireless communication device and the power supply device;
- when the calculated cumulative amount becomes equal to or larger than the reference value, the current monitoring device provides a notification to the control device, so that the control device lets the power supply device to stop the supplying of the power from the battery to the wireless communication device except the time of receiving the external signal; and
- when the power supply device fails the stopping of the supplying of the power from the battery to the wireless communication device, the current monitoring device stops the power supply device after reaching of the calculated cumulative amount to the second reference value, which is larger than the reference value.

12. The onboard wireless communication system according to claim 7, wherein:
- the controller includes:
  - a current monitoring device that calculates the cumulative amount and determines whether the calculated cumulative amount is equal to or larger than the reference value to see whether the calculated cumulative amount becomes equal to or larger than the reference value; and
  - a control device that is provided separately from the current monitoring device and controls the wireless communication device and the power supply device;
- when the calculated cumulative amount becomes equal to or larger than the reference value, the current monitoring device provides a notification to the control device, so that the control device lets the power supply device to stop the supplying of the power from the battery to the wireless communication device except the time of receiving the external signal; and
- when the current monitoring device receives the external signal before reaching of the calculated cumulative amount to the reference value, the current monitoring device halts the determining of whether the calculated cumulative amount is equal to or larger than the reference value.

13. An onboard wireless communication system comprising:
wireless communication means that transmits a signal to an outside;
power supply means that supplies power from a battery to the wireless communication means;
control means that controls the power supply from the battery to the wireless communication means and transmission of an emergency report signal from the wireless communication means to the outside; and
current monitoring means that calculates a cumulative amount of current fed from the battery after the battery starts discharging, wherein
the control means includes signal transmission instructing means that issues an instruction to the wireless communication means for transmitting the emergency report signal to the outside on a condition that the emergency signal is detected while the power is supplied from the power supply means to the wireless communication means,
the current monitoring means includes power supply determining means, emergency signal detecting means, cumulative amount comparing means, calculation halting means, and power supply halting means,
the power supply determining means determines whether power is supplied from the power supply means to the wireless communication means,
the emergency signal detecting means detects an emergency signal outputted from an outside of the onboard wireless communication system,
the cumulative amount comparing means compares the calculated cumulative amount with a reference value and determines whether the calculated cumulative amount is equal to or larger than the reference value,
the calculation halting means temporarily stops the calculation of the cumulative amount at least until the control means completes the transmission of the emergency report signal from the wireless communication means to the outside on the condition that the emergency signal is detected by the emergency signal detecting means while the calculated cumulative amount is still smaller than the reference value, and
the power supply halting means stops the power supply from the power supply means to the wireless communication means based on an instruction from the control means on a condition that the calculated cumulative amount is equal to or larger than the reference value while the emergency signal is still not detected by the emergency signal detecting means.

14. The onboard wireless communication system according to claim 13, wherein the current monitoring means resets the calculated cumulative amount on a condition that the emergency signal is detected by the emergency signal detecting means while the calculated cumulative amount is still smaller than the reference value.

15. The onboard wireless communication system according to claim 13, wherein the current monitoring means modifies the reference value on a condition that the emergency signal is detected by the emergency detecting means while the calculated cumulative amount is still smaller than the reference value.

16. The onboard wireless communication system according to claim 13, wherein the current monitoring means is provided separately from the control means.

17. The onboard wireless communication system according to claim 13, wherein:
the current monitoring means further includes failure detecting means and second cumulative amount comparing means;
the failure detecting means detects a failure to stop the power supply from the power supply means to the wireless communication means;
the second cumulative amount comparing means compares the calculated cumulative amount with a second reference value and determines whether the calculated cumulative amount is equal to or larger than the second reference value; and
the power supply halting means stops the power supply from the power supply means to the wireless communication means on a condition that the calculated cumulative amount is equal to or larger than the second reference value.

18. The onboard wireless communication system according to claim 13, wherein the emergency signal detecting means determines whether the emergency signal is inputted from the outside of the onboard wireless communication system to the control means immediately after the battery starts discharging.

19. The onboard wireless communication system according to claim 13, wherein the control means further includes reference value modifying means that modifies the reference value on the condition that the emergency signal is detected while the calculated cumulative amount is still smaller than the reference value.

20. An onboard wireless communication system comprising:
wireless communication means that transmits a signal to an outside;
power supply means that supplies power from a battery to the wireless communication means;
control means that controls the power supply from the battery to the wireless communication means and transmission of an emergency report signal from the wireless communication means to the outside; and
current monitoring means that calculates a cumulative amount of current fed from the battery after the battery starts discharging, wherein
the control means includes signal transmission instructing means that issues as instruction to the wireless communication means for transmitting the emergency report signal to the outside on a condition that the emergency signal is detected while the power is supplied from the power supply means to the wireless communication means,
the current monitoring means includes power supply determining means, emergency signal detecting means, cumulative amount comparing means, power supply halting means, and comparison halting means,
the power supply determining means determines whether power is supplied from the power supply means to the wireless communication means,
the emergency signal detecting means detects an emergency signal outputted from an outside of the onboard wireless communication system,
the cumulative amount comparing means compares the calculated cumulative amount with a reference value and determines whether the calculated cumulative amount is equal to or larger than the reference value,
the power supply halting means stops the power supply from the power supply means to the wireless communication means based on an instruction from the control means on a condition that the calculated cumulative amount is equal to or larger than the reference value, and the comparison halting means stops the comparison between the calculated cumulative amount and the reference value at least until the control means completes the transmission of the emergency report signal from the wireless communication means to the outside on a condition that the emergency signal is detected by the emergency signal detecting means.

21. The onboard wireless communication system according to claim 20, wherein the current monitoring means is provided separately from the control means.

22. The onboard wireless communication system according to claim 20, wherein:

the current monitoring means further includes failure detecting means and second cumulative amount comparing means;

the failure detecting means detects a failure to stop the power supply from the power supply means to the wireless communication means;

the second cumulative amount comparing means compares the calculated cumulative amount with a second reference value and determines whether the calculated cumulative amount is equal to or larger than the second reference value; and the power supply halting means stops the power supply from the power supply means to the wireless communication means in a condition that the calculated cumulative amount is equal to or larger than the second reference value.

23. The onboard wireless communication system according to claim 20, wherein the emergency signal detecting means determines whether the emergency signal is inputted form the outside of the onboard wireless communication system to the control means immediately after the battery starts discharging.

24. An onboard wireless communication system comprising:

wireless communication means that transmits a signal to an outside;

power supply means that supplies power from a battery to the wireless communication means;

control means that controls the power supply from the battery to the wireless communication means and transmission of an emergency report signal from the wireless communication means to the outside; and current monitoring means that calculates a cumulative amount of current fed from the battery after the battery starts discharging, wherein the control means includes signal transmission instructing means that issues an instruction to the wireless communication means for transmitting the emergency report signal to the outside on a condition that the emergency signal is detected while the power is supplied from the power supply means to the wireless communication means, the current monitoring means includes power supply determining means, emergency signal detecting means, cumulative amount comparing means, power supply halting means, and power supply maintaining means, the power supply determining means determines whether power is supplied from the power supply means to the wireless communication means, the emergency signal detecting means detects an emergency signal outputted from an outside of the onboard wireless communication system, the cumulative amount comparing means compares the calculated cumulative amount with a reference value and determines whether the calculated cumulative amount is equal to or larger than the reference value, the power supply halting means stops the power supply from the power supply means to the wireless communication means based on an instruction from the control means on a condition that the calculated cumulative amount is equal to or larger than the reference value, and the power supply maintaining means maintains the power supply from the power supply means to the wireless communication means at least until the control means completes the transmission of the emergency report signal from the wireless communication means to the outside even on a condition that the emergency signal is detected by the emergency signal detecting means while the calculated cumulative amount is equal to or larger than the reference value.

25. The onboard wireless communication system according to claim 24, wherein the current monitoring means is provided separately from the control means.

26. The onboard wireless communication system according to claim 24, wherein:

the current monitoring means further includes failure detecting means and second cumulative amount comparing means;

the failure detecting means detects a failure to stop the power supply from the power supply means to the wireless communication means;

the second cumulative amount comparing means compares the calculated cumulative amount with a second reference value and determines whether the calculated cumulative amount is equal to or larger than the second reference value; and the power supply halting means stops the power supply from the power supply means to the wireless communication means on a condition that the calculated cumulative amount is equal to or larger than the second reference value.

27. The onboard wireless communication system according to claim 24, wherein the emergency signal detecting means determines whether the emergency signal is inputted from the outside of the onboard wireless communication system to the control means immediately after the battery starts discharging.

28. An onboard wireless communication system comprising:

wireless communication means that transmits a signal to an outside;

power supply means that supplies power from a battery to the wireless communication means; and control means that controls the power supply from the battery to the wireless communication means and transmission of an emergency report signal from the wireless communication means to the outside, wherein the control means includes power supply determining means, emergency signal detecting means, signal transmission instructing means, cumulative amount calculating means, cumulative amount comparing means, calculation halting means, and power supply halting means, the power supply determining means determines whether power is supplied from the power supply means to the wireless communication means, the emergency signal detecting means determines whether an emergency signal is outputted from an outside of the onboard wireless communication system, the signal transmission instructing means issues an instruction to the wireless communication means for transmitting an emergency report signal to the outside on a condition that the emergency signal is detected while the power is supplied from the power supply means to the wireless communication means, the cumulative amount calculating means calculates the cumulative amount of current fed from the battery after the battery starts discharging, the cumulative amount comparing means compares the calculated cumulative amount with a reference value and determines whether the calculated cumulative amount is equal to or larger than the reference value, the calculation halting means temporarily stops the calculation of the cumulative amount at least until the transmission of the emergency signal from the wireless communication means to the outside is completed on a condition that the emergency signal is detected by the emergency signal detecting means, and the power supply halting means stops the power supply from the power supply means to the wireless communication means on a condition that the emergency signal is not detected by the emergency signal detecting means while the calculated cumulative amount is still smaller than the reference value.

29. The onboard wireless communication system according to claim 28, wherein the control means further includes cumulative amount resetting means that resets the calculated cumulative amount at a time on a condition that the emergency signal is detected while the calculated cumulative amount is still smaller than the reference value.

30. The onboard wireless communication system according to claim 28, wherein the emergency signal detecting means determines whether the emergency signal is inputted from the outside of the onboard wireless communication system immediately after the battery starts discharging.

31. An onboard wireless communication system comprising:

wireless communication means that transmits a signal to an outside;

power supply means that supplies power from a battery to the wireless communication means; and control means that controls the power supply from the battery to the wireless communication means and transmission of an emergency report signal from the wireless communication means to the outside, wherein the control means includes power supply determining means, emergency signal detecting means, signal transmission instructing means, cumulative amount calculating means, cumulative amount comparing means, power supply halting means, and comparison halting means, the power supply determining means determines whether power is supplied from the power supply means to the wireless communication means, the emergency signal detecting means determines whether an emergency signal is outputted from an outside of the onboard wireless communication system, the signal transmission instructing means issues an instruction to the wireless communication means for transmitting an emergency report signal to the outside on a condition that the emergency signal is detected while the power is supplied from the power supply means to the wireless communication means, the cumulative amount calculating means calculates the cumulative amount of current fed from the battery after the battery starts discharging, the cumulative amount comparing means compares the calculated cumulative amount with a reference value and determines whether the calculated cumulative amount is equal to or larger than the reference value, the power supply halting means stops the power supply from the power supply means to the wireless communication means on a condition that the calculated cumulative amount is equal to or larger than the reference value, and the comparison halting means stops the comparison between the calculated cumulative amount and the reference value at least until the control means completes the transmission of the emergency report signal from the wireless communication means to the outside when the emergency signal is detected by the emergency signal detecting means.

32. The onboard wireless communication system according to claim 31, wherein the emergency signal detecting means determines whether the emergency signal is inputted from the outside of the onboard wireless communication system immediately after the battery starts discharging.

33. An onboard wireless communication system comprising:

wireless communication means that transmits a signal to an outside;

power supply means that supplies power from a battery to the wireless communication means; and control means that controls the power supply from the battery to the wireless communication means and transmission of an emergency report signal from the wireless communication means to the outside, wherein the control means includes power supply determining means, emergency signal detecting means, signal transmission instructing means, cumulative amount calculating means, cumulative amount comparing means, power supply halting means, and power supply maintaining means, the power supply determining means determines whether power is supplied from the power supply means to the wireless communication means, the emergency signal detecting means determines whether an emergency signal is outputted from an outside of the onboard wireless communication system, the signal transmission instructing means issues an instruction to the wireless communication means for transmitting an emergency report signal to the outside on a condition that the emergency signal is detected while the power is supplied from the power supply means to the wireless communication means, the cumulative amount calculating means calculates the cumulative amount of current fed from the battery after the battery starts discharging, the cumulative amount comparing means compares the calculated cumulative amount with a reference value and determines whether the calculated cumulative amount is equal to or larger than the reference value, the power supply halting means stops the power supply from the power supply means to the wireless communication means on a condition that the calculated cumulative amount is equal to or larger than the reference value, and the power supply maintaining means maintains the power supply from the power supply means to the wireless communication means at least until the control means completes the transmission of the emergency report signal from the wireless communication means to the outside even on a condition that the emergency signal is detected by the emergency signal detecting means.

34. The onboard wireless communication system according to claim 33, wherein the emergency signal detecting means determines whether the emergency signal is inputted from the outside of the onboard wireless communication system immediately after the battery starts discharging.

* * * * *